United States Patent
Wallace et al.

(10) Patent No.: US 11,519,538 B2
(45) Date of Patent: Dec. 6, 2022

(54) COUPLING ASSEMBLY TO CONNECT FIRST AND SECOND CONDUITS

(71) Applicant: The Boeing Company, Chicago, IL (US)

(72) Inventors: Jonathan B. Wallace, Mount Vernon, WA (US); Samuel James Tutko, Covington, WA (US); Allan Lynn McQueen, Auburn, WA (US); Gregor William Dempster, Kirkland, WA (US); Joshua D. Burch, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 788 days.

(21) Appl. No.: 16/052,739

(22) Filed: Aug. 2, 2018

(65) Prior Publication Data
US 2020/0041049 A1 Feb. 6, 2020

(51) Int. Cl.
*F16L 23/22* (2006.01)
(52) U.S. Cl.
CPC .................................. *F16L 23/22* (2013.01)
(58) Field of Classification Search
CPC ......... F16L 23/22; F16L 37/56; F16L 37/565; F16L 23/04
USPC .................................. 285/123.3, 294.3–294.4
See application file for complete search history.

(56) References Cited

U.S. PATENT DOCUMENTS

| | | | | |
|---|---|---|---|---|
| 2,778,661 | A * | 1/1957 | Leighton | F16L 27/1133 285/110 |
| 2,937,037 | A * | 5/1960 | Woolsey | F16L 27/1133 285/233 |
| 4,176,865 | A * | 12/1979 | Felton | F16L 25/0036 285/373 |
| 4,881,760 | A * | 11/1989 | Runkles | F16L 23/04 285/93 |
| 4,900,070 | A * | 2/1990 | Runkles | F16L 23/04 285/233 |
| 4,929,000 | A * | 5/1990 | Annestedt, Sr. | E04F 17/02 138/148 |
| 6,848,720 | B2 | 2/2005 | Carns et al. | |
| 6,971,682 | B2 | 12/2005 | Hoang et al. | |
| 9,360,144 | B2 * | 6/2016 | Carns | F16L 25/01 |
| 2004/0207197 | A1 * | 10/2004 | Hoang | F16L 37/565 285/123.15 |
| 2009/0322078 | A1 * | 12/2009 | Wern | F16L 25/01 285/413 |
| 2015/0102600 | A1 * | 4/2015 | Schooley | F16L 23/06 285/409 |

FOREIGN PATENT DOCUMENTS

| DE | 2405827 B1 * | 6/1975 | F16L 23/04 |
|---|---|---|---|
| FR | 2974613 A1 * | 11/2012 | F16L 25/01 |

* cited by examiner

*Primary Examiner* — Matthew Troutman
*Assistant Examiner* — Fannie C Kee
(74) *Attorney, Agent, or Firm* — Coats & Bennett, PLLC (57) ABSTRACT

A coupling assembly that connects first and second conduits and prevents a fluid from leaking from a junction formed between the first and second conduits. The coupling assembly includes an inner coupling and an outer coupling that extends around and connects the first and second conduits. A retention strap extends around the first and second conduits and is positioned between the inner and outer coupling.

20 Claims, 7 Drawing Sheets

COUPLING ASSEMBLY TO CONNECT FIRST AND SECOND CONDUITS

STATEMENT OF GOVERNMENT RIGHTS

This invention was made with government support under FA8625-11-C-6600 awarded by Department of Defense. The government has certain rights in this invention.

TECHNOLOGICAL FIELD

The present disclosure relates generally to a coupling assembly that connects together first and second conduits and, more specifically, to a coupling assembly that maintains its integrity to prevent a leak from the conduits.

BACKGROUND

Piping systems are used in many contexts to move fluids. The piping systems include separate conduits that abut together to form a continuous pathway for the fluids. The conduits can include various shapes and sizes, and can be connected together as needed to deliver the fluid from a first point to a second point. One specific context of a piping system is for moving fuel within an aircraft.

The piping systems are constructed to prevent the fluid leakage. One area of the piping system that is susceptible to leakage is the joint between two conduits. Coupling assemblies can be used to connect the conduits and to prevent leaks. The coupling assemblies contact against the conduits and secure the conduits together. A drawback of existing coupling assemblies is the inability to maintain the conduits together and prevent leaks after the coupling assembly no longer reacts to a load applied through the two conduits.

SUMMARY

One aspect is directed to a coupling assembly to connect a first conduit to a second conduit. The coupling assembly includes inner and outer couplings sized to extend around a junction formed between the first and second conduits. The outer coupling includes a larger width than the inner coupling and is spaced a greater distance from the first and second conduits with a gap defined between the inner and outer couplings. A retention strap is positioned within the gap and extends around the junction between the inner and outer couplings. The retention strap is spaced apart from each of the inner and outer couplings during operation of the inner coupling with the inner coupling securing the first and second conduits to prevent a leak.

In one aspect, a load is applied to the inner coupling by the first and second conduits and the retention strap is positioned a first distance away from the inner coupling so the load is not applied to the retention strap.

In one aspect, the retention strap includes an elongated shape with opposing first and second end portions that are connected together by a hinge.

In one aspect, the hinge includes a first plate attached to the first end portion, a second plate attached to the second end portion, and a pin that extends through receptacles on the first and second plates.

In one aspect, a latch is positioned on the inner coupling to secure the inner coupling to the first and second conduits with the retention strap including an opening that extends over the latch.

In one aspect, the retention strap is positioned in the gap and is positioned closer to the inner coupling than to the outer coupling.

In one aspect, a sealant is positioned between the retention strap and the inner coupling to operatively connect the retention strap to the inner coupling.

One aspect is directed to a coupling assembly to secure a junction formed between a first conduit and a second conduit. The coupling assembly includes an inner coupling that extends around and secures the first and second conduits together at an inner flexible joint. An outer coupling extends over and around the inner coupling and secures the first and second conduits together at an outer flexible joint. A retention strap is positioned between the inner and outer couplings and extends around the first and second conduits. The inner coupling seals the inner flexible joint to prevent fluid from leaking and is subjected to a load from the first and second conduits while the retention strap is spaced outward from the inner coupling and the load is not applied to the retention strap. During a second operation in which fluid leaks from the inner flexible joint, the retention strap is subjected to the load.

In one aspect, the retention strap includes a hinge that connects together first and second end portions of the retention strap.

In one aspect, the outer coupling includes a larger width than the retention strap and the inner coupling.

In one aspect, a latch is positioned on the inner coupling to secure the inner coupling to the first and second conduits, and an opening that extends through the retention strap is positioned over the latch with the opening allowing access to the latch when the retention strap is positioned over the inner coupling.

In one aspect, the retention strap is positioned in a gap defined between the inner and outer couplings and is positioned in closer proximity to the inner coupling than to the outer coupling to support the first and second conduits when the inner coupling is not carrying the load.

In one aspect, a sealant is positioned between the retention strap and the inner coupling with the sealant connecting the retention strap to the inner coupling.

In one aspect, the retention strap contacts against the inner coupling during the second operation.

One aspect is directed to a method of coupling together a first conduit to a second conduit. The method includes securing an inner coupling around a junction formed by the first and second conduits and securing the inner coupling to the first and second conduits. The method includes positioning a retention strap outward from and around the inner coupling. The method includes after positioning the retention strap, positioning an outer coupling outward from and around the retention strap and the inner coupling and securing the outer coupling to the first and second conduits.

In one aspect, the method includes sealing the first and second conduits together with the inner coupling with the retention strap being positioned over the inner coupling and spaced outward from the inner coupling on an opposing side from the first and second conduits, and preventing a load from the first and second conduits to be applied to the retention strap.

In one aspect, the method includes subjecting the retention strap to the load after a fluid from within the first and second conduits leaks from the junction formed between the first and second conduits.

In one aspect, the method includes preventing a fluid from within the first and second conduits from leaking beyond the outer coupling by sealing the first and second conduits together with the outer coupling.

In one aspect, the method includes inserting a sealant into a gap formed between the inner coupling and the retention strap.

In one aspect, the method includes transporting fuel within an aircraft through the first and second conduits.

The features, functions and advantages that have been discussed can be achieved independently in various aspects or may be combined in yet other aspects, further details of which can be seen with reference to the following description and the drawings.

DETAILED DESCRIPTION

The present application is directed to a coupling assembly to connect first and second conduits and prevent a fluid from leaking from a junction formed between the first and second conduits. The coupling assembly includes an inner coupling and an outer coupling each connected to and securing the junction. A retention strap is positioned between the inner and outer coupling. In the event the inner coupling no longer sustains a load applied by the first and second conduits which can result in a leak in the inner coupling, the retention strap can be subjected to the load applied by the first and second conduits. The retention strap maintains the integrity of the outer coupling to secure the first and second conduits together and prevent a leak.

Figure 1:
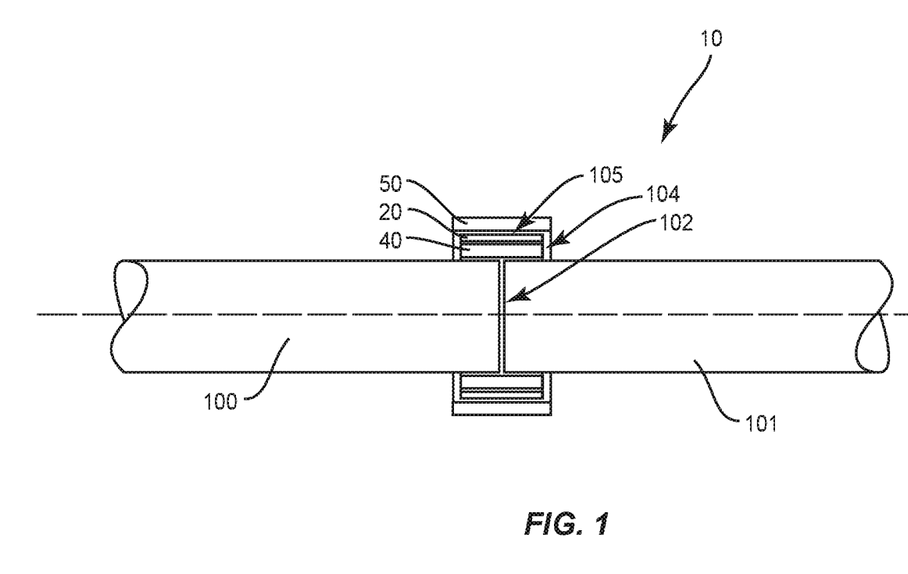
FIG. 1 is a schematic section view of a coupling assembly connected across a dual barrier flexible joint formed between first and second conduits.

FIG. 1 schematically illustrates a coupling assembly 10 that secures together first and second conduits 100, 101 at a junction 102. The first and second conduits 100, 101 are aligned along a centerline C. The coupling assembly 10 extends around first and second conduits 100, 101 and forms a dual barrier flexible joint that includes an inner flexible joint 104 formed by an inner coupling 40 and an outer flexible joint 105 formed by an outer coupling 50. The coupling assembly 10 includes the inner coupling 40 that extends around the junction 102 and is secured to each of the first and second conduits 100, 101. The outer coupling 50 extends around the inner coupling 40 and also secures together the first and second conduits 100, 101. A retention strap 20 extends around the first and second conduits 100, 101 and is positioned between the inner and outer couplings 40, 50. The retention strap 20 is spaced away from each of the inner and outer couplings 40, 50.

Each of the conduits 100, 101, the inner coupling 40, outer coupling 50, and retention strap 20 have a respective width W1, W2, W3, W4, W5. In a particular example, the conduits 100, 101, the inner coupling 40, outer coupling 50, and retention strap 20 are annular and are positioned radially with respect to each other. In such an embodiment, the widths W1, W2, W3, W4, W5 are diameters. Generally, the inner coupling 40, outer coupling 50, and retention strap 20 are shaped to correspond to a shape of the conduits 100, 101; however, the inner coupling 40, outer coupling 50, and/or retention strap 20 can have any suitable shape that enables the coupling assembly 10 to function as described herein.

During normal operation of the inner coupling 40, fluid is contained within the first and second conduits 100, 101 and the retention strap 20 is not subjected to a load that is applied through the first and second conduits 100, 101. During normal operation, the inner coupling 40 supports the load that is applied through the first and second conduits 100, 101. During a second operation in which the inner coupling 40 no longer supports a load applied by the first and second conduits 100, 101, fluid can leak beyond the inner coupling 40. During the second operation, the retention strap 20 is subjected to the load. Applying the load to the retention strap 20 during the second operation maintains the outer coupling 50 secured to the first and second conduits 100, 101 and the integrity of the outer flexible joint. The outer coupling 50 is able to prevent fluid from leaking beyond the coupling assembly 10.

The retention strap 20 is sized to nest inside the outer coupling 50 during normal operation when the inner coupling 40 is intact and operative. During the normal operation, the retention strap 20 is not subject to a load from the first and second conduits 100, 101 and the inner coupling 40 prevents leaking at the junction 102. In the event of a leak from the inner coupling 40 due to the inner coupling 40 no longer maintaining the first and second conduits 100, 101 together, the retention strap 20 maintains its position and is subjected to the load that is applied by the first and second conduits 100, 101. During this second operation, fluid can leak from the junction 102 beyond the inner coupling 40. The load is applied to the retention strap 20 that allows for the outer coupling 50 to remain intact and prevent leaking from the outer coupling 50 and overall leaking of the coupling assembly 10. The retention strap 20 can ensure that no single latent failure can lead to subsequent failures of a system having the conduits 100, 101 and coupling assembly 10.

Figure 2:
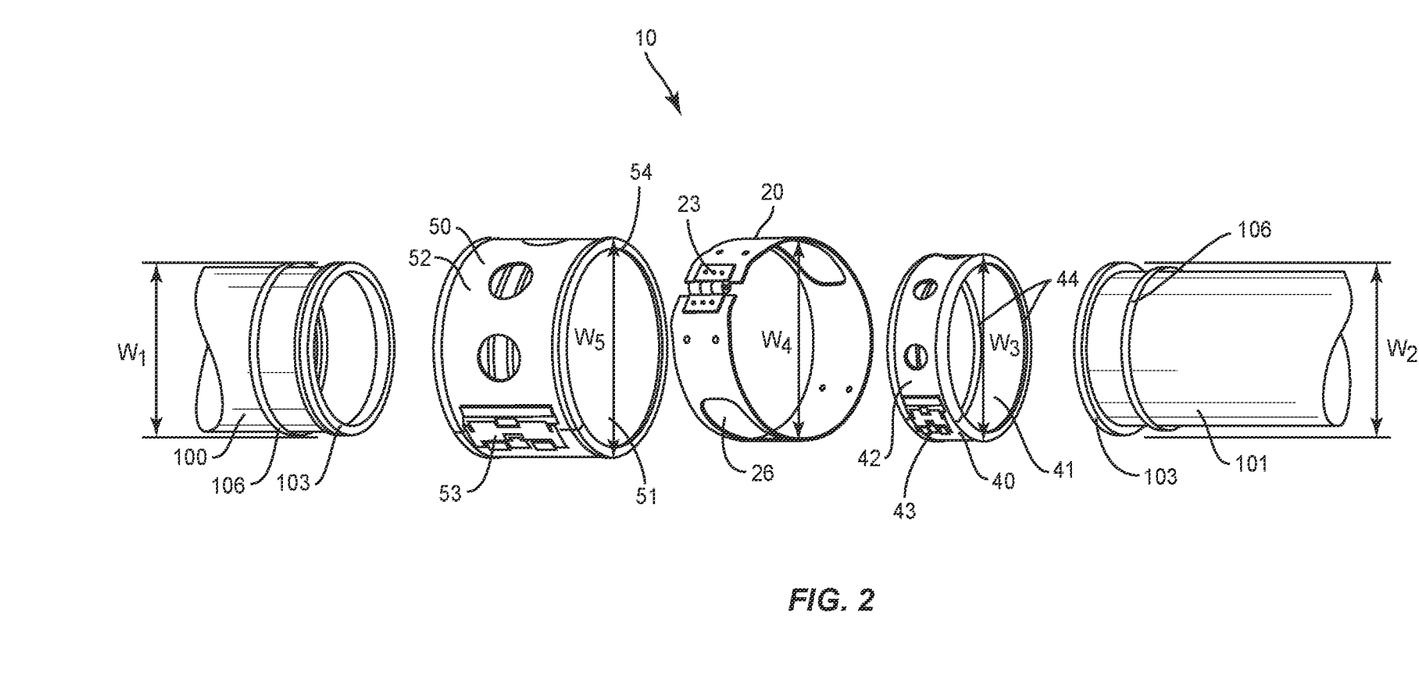
FIG. 2 is an exploded perspective view of a coupling assembly configured to be connected to first and second conduits.

FIG. 2 illustrates an exploded view of the coupling assembly 10 that includes the retention strap 20 sized to be positioned between the inner coupling 40 and the outer coupling 50. The coupling assembly 10 is sized and configured to secure together the first and second conduits 100, 101.

Figure 3:
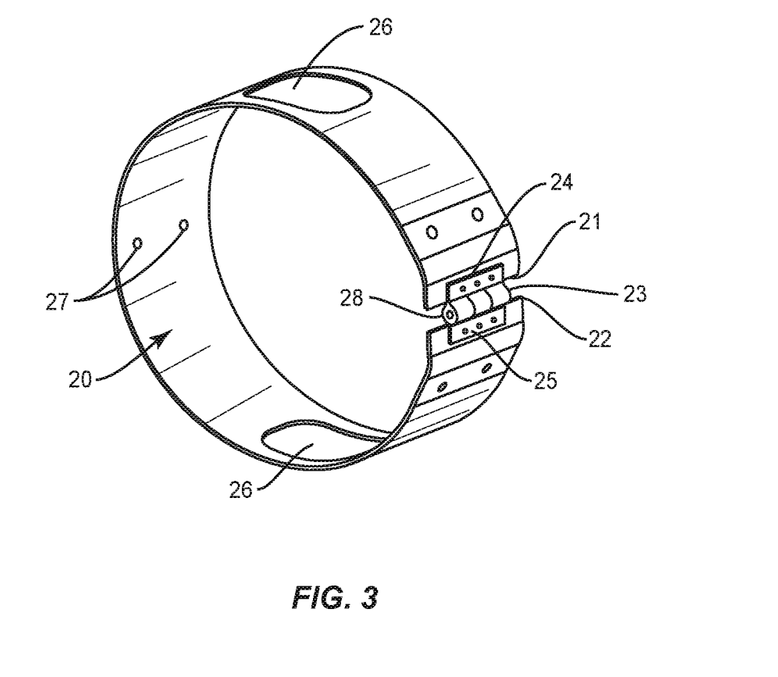
FIG. 3 is a perspective view of a retention strap.

As illustrated in FIG. 2 and FIG. 3, the retention strap 20 has an elongated shape with opposing first and second end portions 21, 22. The retention strap 20 is a single piece that extends from the first end portion 21 to the second end portion 22 and includes a consistent construction throughout (e.g. same material, shape, and size). Alternatively, the retention strap 20 can be constructed from two or more separate sections that are connected together. In one example, the retention strap 20 is constructed from aluminum. In one specific design, the retention strap 20 is constructed from 6013 aluminum sheet per AMS 4347 and formed in the T4 condition then aged to the T6 condition per BAC 5602.

The retention strap 20 can include a shape that matches the shape of the inner coupling 40. The retention strap 20 includes a generally annular shape with the first and second end portions 21, 22 secured together by a hinge 23. The annular shape can match the outer shape of the inner coupling 40 and/or the first and second conduits 100, 101, as described above. The retention strap 20 can be made in other shapes, including oval, oblong, and another suitable shapes. A first plate 24 of the hinge 23 is secured by fasteners at the first end portion 21, and a second plate 25 is secured by fasteners at the second end portion 22. The plates 24, 25 each include one or more receptacles that align together and receive a pin 28 to secure together the first and second end portions 21, 22. The first and second plates 24, 25 can be constructed from various metals. One specific design includes 7050-T7451 aluminum plate per AMS 4050 and with a thickness of between 0.25-0.75 inches (6.35 mm-19.05 mm).

One or more openings 26 extend through the retention strap 20 away from the first and second ends. Each of the one or more openings 26 are sized to extend around a latch 43 of the inner coupling 40 to provide access to the latch 43. The latch 43 can be accessed through the opening 26 without removing the retention strap 20 from the inner coupling 40. One design includes a pair of openings 26 on opposing sides to extend over a pair of latches 43 on the inner coupling 40. One or more smaller openings 27 extend through the retention strap 20 to provide a port for inserting sealant 70 into a space formed between the retention strap 20 and the inner coupling 40.

As illustrated in FIG. 2, the inner coupling 40 includes first and second sections 41, 42. Each section 41, 42 includes a semi-circular shape and extends partially around the junction 102. The semi-circular shapes provide for extending around the outer diameter of the first and second conduits 100, 101. One or both sections 41, 42 can also include non-spherical shapes, such as an oblong shape. Both sections 41, 42 can include the same or different shapes. The lateral edges of the sections 41, 42 can include rims 44 to engage with ferrules 103 on the first and second conduits 100, 101. At least one latch 43 is connected to and secures the sections 41, 42 together and onto the first and second conduits 100, 101.

Figure 4:
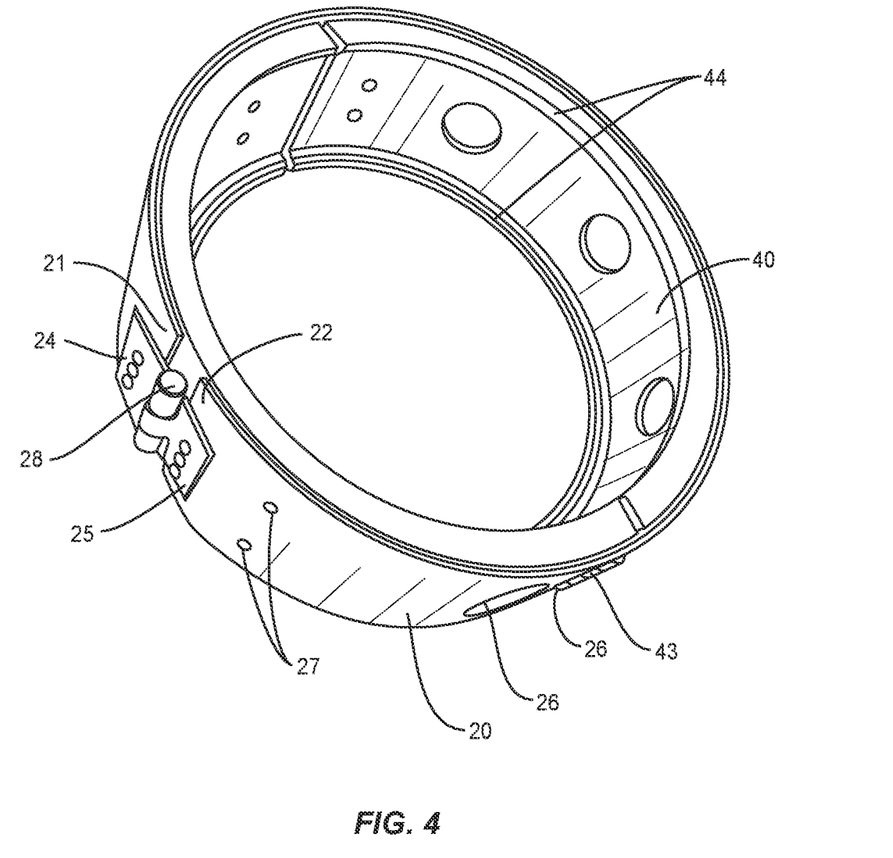
FIG. 4 is a perspective view of a retention strap extending around an inner coupling.

FIG. 4 illustrates the retention strap 20 extending around the inner coupling 40. The inner coupling 40 includes a smaller width $W_3$ than the width $W_4$ of the retention strap 20. This sizing provides for the retention strap 20 to be spaced away from the inner coupling 40 when mounted to the first and second conduits 100, 101. An opening 26 on the retention strap 20 are aligned with and extend over the latch 43. This provides for the latch 43 to be accessible to move between open and closed positions without requiring removal of the retention strap 20. The hinge 23 of the retention strap 20 is spaced away from the latch 43 of the inner coupling 40. This positioning prevents the latch 43 and hinge 23 from interfering with each other.

The outer coupling 50 as illustrated in FIG. 2 includes first and second sections 51, 52. Each section 51, 52 includes a semi-circular shape and extends partially around the inner flexible joint 104. Alternatively, one or both of the first and second sections 51, 52 can include non-circular shapes, such as oval or oblong. The first and second sections 51, 52 can include the same or different shapes. Latches 53 are connected to and secure the sections 51, 52 together and onto the first and second conduits 100, 101. The lateral edges of the sections 51, 52 can include rims 54 that extend inward to engage with ferrules 106 on the first and second conduits 100, 101. The width of the outer coupling 50 is greater than the retention strap 20. This sizing provides for the outer coupling 50 to be spaced away from the retention strap 20 when mounted to the first and second conduits 100, 101.

Figure 5:
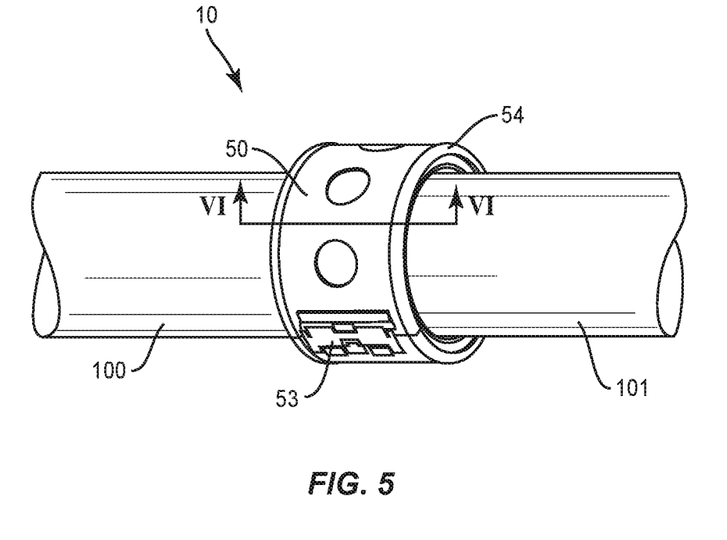
FIG. 5 is a perspective view of a coupling assembly connected to first and second conduits.

FIG. 5 illustrates a perspective view of the coupling assembly 10 secured to first and second conduits 100, 101. The outer coupling 50 can be sized to visually obscure the retention strap 20 and the inner coupling 40.

Figure 6:
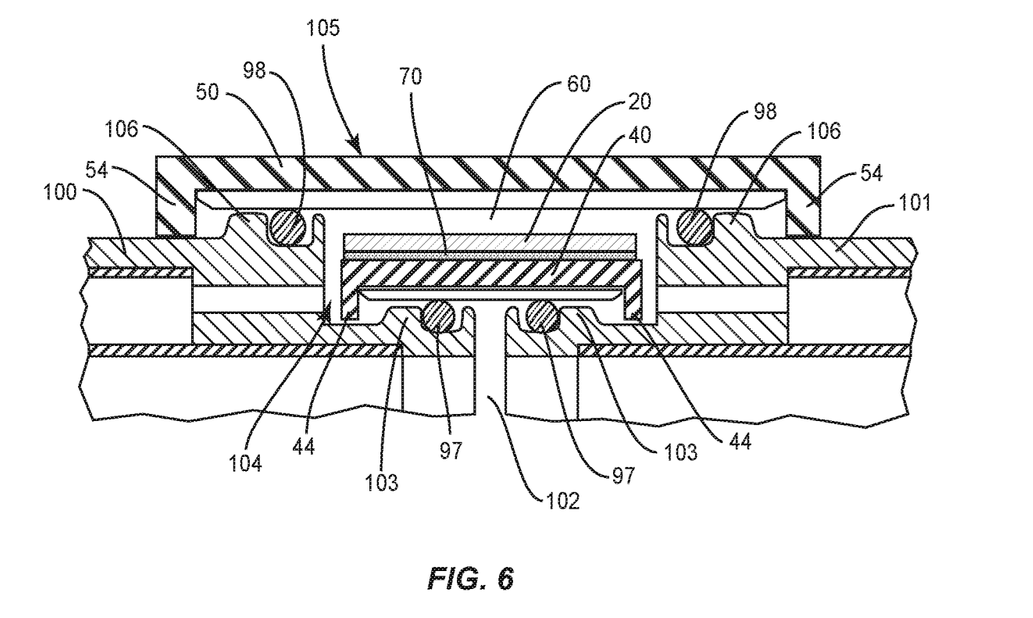
FIG. 6 is a section view cut along line VI-VI of FIG. 5 of the coupling assembly connected to the first and second conduits during normal operation.

FIG. 6 illustrates a section view of the coupling assembly 10 attached to the first and second conduits 100, 101 taken at line VI-VI in FIG. 5. In FIG. 6, the coupling assembly 10 is in normal operation. The inner coupling 40 is secured to the first and second conduits 100, 101 to form an inner flexible joint 104 to prevent fluid from leaking from the junction 102. The rims 44 that extend inward on the inner coupling 40 engage with ferrules 103 that extend outward from the first and second conduits 100, 101. Seals 97 are positioned to further prevent fluid leakage. Similarly, the outer coupling 50 is secured to the first and second conduits 100, 101 and forms an outer flexible joint 105. The rims 54 engage the ferrules 106 that extend outward from the first and second conduits 100, 101. Seals 98 are positioned to further prevent fluid leakage.

Seals 97 extends around each of the conduits 100, 101 in proximity to the ferrules 103. Seals 98 extend around each of the conduits 100, 101 in proximity to the ferrules 106. Each of the seals 97, 98 can be an elastomer and are configured to be compressed in the coupling assembly 10 to create a seal at the junction 102. The seals 97, 98 can include a round cross-section as illustrated in FIG. 6. The seals 97, 98 can be constructed from a variety of material, including but not limited to synthetic rubbers and thermoplastics.

The retention strap 20 is positioned in a gap 60 that is formed between the inner and outer couplings 40, 50. The width $W_4$ of the retention strap 20 is larger than the width $W_3$ of the inner coupling 40 and smaller than the width $W_5$ of the outer coupling 50 to allow for the retention strap 20 to be positioned between the inner and outer couplings 40, 50. The relative sizing can provide for the retention strap 20 to be dimensionally positioned closer to the inner coupling 40 than the outer coupling 50.

Sealant 70 is positioned between the retention strap 20 and the inner coupling 40. The sealant 70 provides a connection between the inner coupling 40 and the retention strap 20. The sealant 70 can also inhibit relative motion between the retention strap 20 and the inner coupling 40. The sealant 70 is injected into this space between the inner coupling 40 and the retention strap 20 through the openings 27 that extend through the retention strap 20. The sealant 70 can be constructed from a variety of different materials, including but not limited to, polysulfide. In one design, the polysulfide is used when the fluid within the first and second conduits 100, 101 is a fuel.

The coupling assembly 10 is designed to function for both a normal function and second operation. During normal functioning, the inner coupling 40 secures the junction 102 and prevents fluid leakage. The inner coupling 40 is subjected to a load (axial and/or radial) applied by the first and second conduits 100, 101. The retention strap 20 extends over and is spaced outward from the inner coupling 40, and does not contact the first and second conduits 100, 101. The retention strap 20 is not subjected to the load during normal functioning.

During the second operation (e.g., an inner coupling leak function) the inner coupling 40 does not sustain a load applied by the first and second conduits 100, 101 and does not secure the junction 102. Accordingly, fluid can leak beyond the inner coupling 40. The retention strap 20 contacts against the first and second conduits 100, 101. This contact can be direct contact with the first and second conduits 100, 101 and/or indirect contact through the inner coupling 40. The retention strap 20 is subjected to the load from the first and second conduits 100, 101. The contact between the retention strap 20 and the first and second conduits 100, 101 provides for the outer coupling 50 to remain secured to the first and second conduits 100, 101, contain the leak, and prevent the fluid from escaping beyond the coupling assembly 10. During the second operation, the load applied to the retention strap 20 can be the entire load subjected on the inner coupling 40, or a portion of the load.

Use of the coupling assembly 10 generally includes initially securing the inner coupling 40 to the first and second conduits 100, 101. The retention strap 20 is then attached over the inner coupling 40. Afterwards, the outer coupling 50 is attached to the first and second conduits 100, 101 and is positioned over the retention strap 20 and the inner coupling 40.

Figure 7:
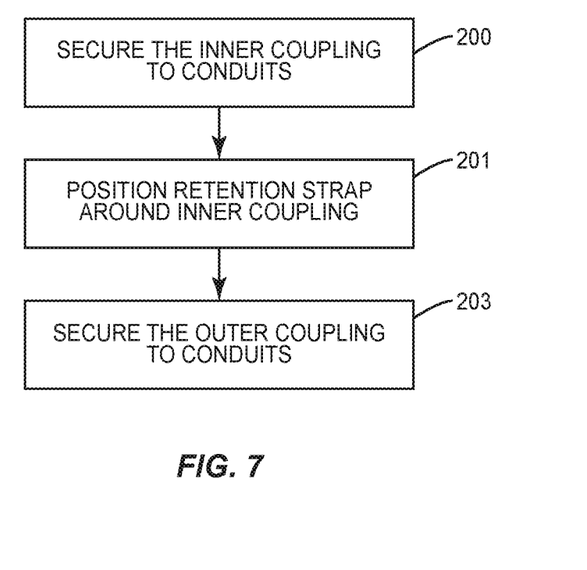
FIG. 7 is a flowchart diagram of a method of coupling together a first conduit to a second conduit.

FIG. 7 includes a method of securing together the first conduit 100 and the second conduit 101. The inner coupling 40 is secured to the first and second conduits 100, 101 and extends around the junction 102 (block 200). This can include positioning the first and second sections 41, 42 around the first and second conduits 100, 101 and then securing the one or more latches 43 to the first and second sections 41, 42.

After the inner coupling 40 is secured the retention strap 20 is positioned outward from and around the inner coupling 40 (block 201). This can include opening the retention strap 20 by moving the first and second end portions 21, 22 apart and inserting the first and second conduits 100, 101 through the enlarged gap between the first and second end portions 21, 22. Once positioned, the first and second end portions 21, 22 are allowed to return towards their initial position and to extend around the inner coupling 40. The plates 24, 25 can be aligned and the pin 28 inserted into the receptacles in the plates 24, 25 to secure the retention strap 20 around the inner coupling 40.

A sealant 70 can be inserted through the openings 27 and into the space between the retention strap 20 and the inner coupling 40. The sealant 70 can be inserted after the hinge 23 is secured, or prior to being secured. The sealant 70 can inhibit relative motion between the retention strap 20 and the inner coupling 40. The sealant 70 can also connect the retention strap 20 and the inner coupling 40.

After positioning the retention strap 20, the outer coupling 50 is positioned outward from and around the retention strap 20 and the inner coupling 40 and is secured to the first and second conduits 100, 101 (block 203). This can include positioning the first and second sections 51, 52 around the first and second conduits 100, 101 and then securing the one or more latches 53. This secures the first and second sections 51, 52 together and secures the outer coupling 50 to the first and second conduits 100, 101.

The coupling assembly 10 can be used in a variety of different contexts. One use is in the transportation industry, including for example, aerospace, marine, automotive applications and other applications that include a piping system. The coupling assembly 10 can be used in a vehicle. One type of vehicle is an aircraft. One particular application is to secure first and second conduits 100, 101 used to transport the fuel from one location to another location in the aircraft.

The coupling assembly 10 can be used with a variety of vehicles. One vehicle includes a commercial aircraft that includes rows of seats each configured to accommodate a passenger. Other vehicles include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof. The coupling assembly 10 can also be used terrestrially in manufacturing or fluid processing facilities.

The present invention can be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A coupling assembly, comprising:
    an inner coupling and an outer coupling, sized to extend around a junction, formed between a first conduit and a second conduit, the outer coupling including a larger width than the inner coupling and being spaced a greater distance from the first conduit and the second conduit with a gap, defined between the inner coupling and the outer coupling;
    a retention strap, positioned within the gap and extending around the junction between the inner coupling and the outer coupling, the retention strap comprising a rimless inner surface that faces the inner coupling;
    a latch positioned on the inner coupling to secure the inner coupling to the first conduit and the second conduit, wherein the retention strap comprises an opening that extends over the latch; and
    wherein the retention strap is spaced apart from each of the inner coupling and the outer coupling with the inner coupling securing the first conduit and the second conduit to prevent a leak.

2. The coupling assembly of claim 1, wherein:
    a load is applied to the inner coupling by the first conduit and the second conduit, and
    the retention strap is positioned a first distance away from the inner coupling so the load is not applied to the retention strap.

3. The coupling assembly of claim 1, wherein the retention strap comprises an elongated shape with a first end portion and a second end portion that are connected together by a hinge and that oppose each other.

4. The coupling assembly of claim 3, wherein:
    the hinge comprises a first plate, attached to the first end portion,
    a second plate, attached to the second end portion, and
    a pin that extends through receptacles on the first plate and the second plate.

5. The coupling assembly of claim 1, wherein the retention strap is positioned in the gap and is positioned closer to the inner coupling than to the outer coupling.

6. The coupling assembly of claim 1, further comprising a sealant positioned between the retention strap and the inner coupling to operatively connect the retention strap to the inner coupling.

7. The coupling assembly of claim 1, wherein the outer coupling comprises a larger width than the retention strap.

8. A method of using the coupling assembly of claim 1 to couple together the first conduit to the second conduit, the method comprising:
    securing the inner coupling around the junction formed between the first conduit and the second conduit and securing the inner coupling to the first conduit and the second conduit;

positioning the retention strap around the inner coupling; and after positioning the retention strap, positioning the outer coupling around the retention strap and the inner coupling and securing the outer coupling to the first and second conduits.

9. The method of claim 8, further comprising:

sealing the first conduit and the second conduit together with the inner coupling; and preventing application of a load from the first conduit and the second conduit to the retention strap.

10. The method of claim 9, further comprising subjecting the retention strap to the load after a fluid from within the first conduit and the second conduit leaks from the junction, formed between the first conduit and the second conduit.

11. The method of claim 10, further comprising preventing the fluid from within the first conduit and the second conduit from leaking beyond the outer coupling by sealing the first and second conduits together with the outer coupling.

12. The method of claim 8, further comprising inserting a sealant into a gap, formed between the inner coupling and the retention strap.

13. The method of claim 8, further comprising transporting fuel within an aircraft through the first conduit and the second conduit.

14. A coupling assembly to secure a junction, formed between a first conduit and a second conduit, the coupling assembly comprising:

an inner coupling that extends around the first conduit and the second conduit and secures the first conduit and the second conduit together at an inner flexible joint;

an outer coupling that extends over and around the inner coupling and secures the first conduit and the second conduit together at an outer flexible joint; and a retention strap, positioned between the inner coupling and the outer coupling and extending around the first conduit and the second conduit, the retention strap comprising a hinge that connects together a first end portion and a second end portion of the retention strap;

wherein:

when the inner coupling seals the junction to prevent fluid from leaking, the retention strap is spaced away from each of the inner coupling, the outer coupling, the first conduit, and the second conduit; and when the inner coupling fails to maintain the first conduit and the second conduit together, and fluid leaks from the junction, the retention strap is subjected to a load.

15. The coupling assembly of claim 14, wherein the outer coupling comprises a larger width than either of the retention strap or the inner coupling.

16. The coupling assembly of claim 14, further comprising:

a latch positioned on the inner coupling to secure the inner coupling to the first conduit and the second conduit; and an opening that extends through the retention strap and is positioned over the latch, the opening providing access to the latch when the retention strap is positioned over the inner coupling.

17. The coupling assembly of claim 14, wherein the retention strap is positioned in a gap, defined between the inner coupling and the outer coupling and is positioned in closer proximity to the inner coupling than to the outer coupling to support the first conduit and the second conduit when the inner coupling is not carrying the load.

18. The coupling assembly of claim 14, further comprising a sealant positioned between the retention strap and the inner coupling, the sealant connecting the retention strap to the inner coupling.

19. The coupling assembly of claim 14, wherein the retention strap contacts against the inner coupling when the inner coupling is not carrying the load.

20. The coupling assembly of claim 14, wherein the retention strap comprises a rimless inner surface that faces the inner coupling.

* * * * *